(12) United States Patent
Aru

(10) Patent No.: US 12,128,387 B2
(45) Date of Patent: Oct. 29, 2024

(54) CO TO $CO_2$ COMBUSTION PROMOTER

(71) Applicant: COCHISE TECHNOLOGY, LLC, Conifer, CO (US)

(72) Inventor: Guido William Aru, Conifer, CO (US)

(73) Assignee: COCHISE TECHNOLOGY, LLC, Conifer, CO (US)

( * ) Notice: Subject to any disclaimer, the term of this patent is extended or adjusted under 35 U.S.C. 154(b) by 0 days.

(21) Appl. No.: 18/419,056

(22) Filed: Jan. 22, 2024

(65) Prior Publication Data

US 2024/0165595 A1    May 23, 2024

Related U.S. Application Data

(60) Division of application No. 17/556,102, filed on Dec. 20, 2021, which is a division of application No. (Continued)

(51) Int. Cl.
| | |
|---|---|
| *B01J 21/04* | (2006.01) |
| *B01J 8/18* | (2006.01) |

(Continued)

(52) U.S. Cl.
CPC ......... *B01J 23/8926* (2013.01); *B01J 8/1827* (2013.01); *B01J 8/26* (2013.01);
(Continued)

(58) Field of Classification Search
CPC ... B01J 21/04; B01J 21/08; B01J 21/12; B01J 21/16; B01J 23/10; B01J 23/42;
(Continued)

(56) References Cited

U.S. PATENT DOCUMENTS

| | | |
|---|---|---|
| 4,171,286 A | 10/1979 | Dight et al. |
| 4,252,636 A | 2/1981 | Mooi |
| | (Continued) | |

FOREIGN PATENT DOCUMENTS

| | | |
|---|---|---|
| CN | 101507924 A | 12/2008 |
| CN | 101992101 A | 3/2011 |
| | (Continued) | |

OTHER PUBLICATIONS

Cocco et al., "Jet cup attrition testing." Powder Technology 200: 224-233 (2010).

(Continued)

*Primary Examiner* — Cam N. Nguyen
(74) *Attorney, Agent, or Firm* — Nixon Peabody LLP; Nicole D. Kling

(57) ABSTRACT

The invention is directed to compositions comprising a CO to $CO_2$ combustion promoter at least one porous particle having a diameter of less than 1 mm and comprising: a) one or more of silica, alumina, zeolite, silica sol, alumina sol, pseudo-boehmite alumina, and/or a clay-based matrix; and b) one or more Group VIII noble metals distributed in the porous particle such that at least 60% of the one or more Group VIII noble metals is present in an outer region of the porous particle; and method of using the same.

30 Claims, 3 Drawing Sheets

Related U.S. Application Data

17/176,222, filed on Feb. 16, 2021, now Pat. No. 11,224,864, which is a continuation of application No. 17/043,031, filed as application No. PCT/US2019/024742 on Mar. 29, 2019, now abandoned.

(51) Int. Cl.

| | | |
|---|---|---|
| *B01J 8/26* | (2006.01) | |
| *B01J 21/08* | (2006.01) | |
| *B01J 21/12* | (2006.01) | |
| *B01J 21/16* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 23/63* | (2006.01) | |
| *B01J 23/72* | (2006.01) | |
| *B01J 23/83* | (2006.01) | |
| *B01J 23/89* | (2006.01) | |
| *B01J 35/30* | (2024.01) | |
| *B01J 35/39* | (2024.01) | |
| *B01J 35/51* | (2024.01) | |
| *B01J 35/61* | (2024.01) | |
| *B01J 35/63* | (2024.01) | |
| *B01J 37/02* | (2006.01) | |
| *B01J 37/08* | (2006.01) | |
| *C01B 32/50* | (2017.01) | |
| *C10G 11/04* | (2006.01) | |

(52) U.S. Cl.
CPC ............ *B01J 21/04* (2013.01); *B01J 21/08* (2013.01); *B01J 21/12* (2013.01); *B01J 23/42* (2013.01); *B01J 23/44* (2013.01); *B01J 23/63* (2013.01); *B01J 35/397* (2024.01); *B01J 35/51* (2024.01); *B01J 35/613* (2024.01); *B01J 35/615* (2024.01); *B01J 35/633* (2024.01); *B01J 37/0221* (2013.01); *B01J 37/0236* (2013.01); *B01J 37/088* (2013.01); *C01B 32/50* (2017.08); *C10G 11/04* (2013.01)

(58) Field of Classification Search
CPC ... B01J 23/44; B01J 23/46; B01J 23/63; B01J 23/72; B01J 23/83; B01J 23/8926; B01J 35/51; B01J 35/397; B01J 35/613; B01J 35/615; B01J 35/633; B01J 8/26; B01J 8/1827; C01B 32/50; C10G 11/04
USPC ........ 502/258–262, 304, 332–334, 339, 355, 502/415
See application file for complete search history.

(56) References Cited

U.S. PATENT DOCUMENTS

| | | | | |
|---|---|---|---|---|
| 4,257,874 | A * | 3/1981 | Bergna | B01J 35/60 |
| | | | | 208/111.1 |
| 4,272,409 | A * | 6/1981 | Bergna | B01J 37/024 |
| | | | | 502/64 |
| 4,422,960 | A * | 12/1983 | Shiroto | B01J 35/60 |
| | | | | 502/247 |
| 4,444,655 | A * | 4/1984 | Shiroto | B01J 23/8872 |
| | | | | 208/111.1 |
| 4,513,101 | A | 4/1985 | Peters et al. | |
| 4,755,282 | A | 7/1988 | Samish et al. | |
| 4,880,592 | A | 11/1989 | Martini et al. | |
| 5,017,541 | A | 5/1991 | Schmidt et al. | |
| 5,102,850 | A | 4/1992 | Sanchez et al. | |
| 6,358,881 | B1 | 3/2002 | Peters | |
| 6,509,290 | B1 | 1/2003 | Vaughn | |
| 6,881,390 | B2 | 4/2005 | Yaluris et al. | |
| 7,045,056 | B2 | 5/2006 | Kelkar et al. | |
| 7,053,024 | B2 | 5/2006 | Baker | |
| 7,230,035 | B2 | 6/2007 | Espinoza | |
| 7,780,935 | B2 * | 8/2010 | Rudesill | B01J 29/68 |
| | | | | 208/254 R |
| 7,879,224 | B2 * | 2/2011 | Euzen | C10G 49/02 |
| | | | | 502/208 |
| 7,959,792 | B2 | 6/2011 | Vaarkamp et al. | |
| 8,002,970 | B2 * | 8/2011 | Euzen | B01J 29/146 |
| | | | | 502/64 |
| 9,358,533 | B2 | 6/2016 | Tran et al. | |
| 9,533,286 | B2 * | 1/2017 | Stamm Masias | B01J 35/393 |
| 9,694,351 | B1 * | 7/2017 | Roy | B01J 35/40 |
| 9,981,252 | B2 | 5/2018 | Carlsson et al. | |
| 10,258,967 | B2 | 4/2019 | Witte et al. | |
| 11,224,864 | B2 | 1/2022 | Aru | |
| 11,590,483 | B2 * | 2/2023 | Shirman | B01J 35/23 |
| 2005/0042158 | A1 | 2/2005 | Yaluris et al. | |
| 2005/0054516 | A1 | 3/2005 | Vaughn | |
| 2006/0204420 | A1 | 9/2006 | Vaarkamp et al. | |
| 2007/0129234 | A1 * | 6/2007 | Stockwell | B01J 35/19 |
| | | | | 502/34 |
| 2007/0197379 | A1 | 8/2007 | Miura | |
| 2009/0050529 | A1 | 2/2009 | Rainer et al. | |
| 2010/0190638 | A1 | 7/2010 | Hagemeyer et al. | |
| 2014/0005031 | A1 * | 1/2014 | Chaumonnot | C10G 47/12 |
| | | | | 502/64 |
| 2015/0352525 | A1 | 12/2015 | Loganathan | |
| 2018/0036717 | A1 | 2/2018 | Cabiac et al. | |
| 2019/0126247 | A1 * | 5/2019 | Deeba | B01J 29/7007 |

FOREIGN PATENT DOCUMENTS

| | | |
|---|---|---|
| CN | 107530685 A | 1/2018 |
| EP | 0151888 A2 | 8/1985 |
| GB | 2310384 A | 8/1997 |
| WO | 2016151454 A1 | 9/2016 |

OTHER PUBLICATIONS

Babich et al., "Nature of nitrogen specie in coke and their role in NOx formation during FCC catalyst regeneration." Applied Catalysis B: Environmental 59.3-4: 205-211 (2005).
Jang et al. "Facile preparation of egg-shell-type pellet catalysts usign immiscibility between hydrophobic solvent and hydrophilic solution: Enhancement of catalytic activity due to position control of metallic nickel inside alumina pellet" Applied Catalysis A: General 530:211-216 (2017).
Lang et al., "Co-oxidation of CO and propylene on Pd/CeO2-ZrO2 and Pd/Al2O3 monolith catalysts: A light-off, kinetics, and mechanistic study." Applied Catalysis B: Environmental 218: 430-442 (2017).
Microspheres Online. "12 Essential Properties of Microspheres—Detailed Guide to Achieve Results." Retrieved from web Apr. 20, 2021. URL: <https://www.microspheres.us/properties-of-microspheres/>. 7 pages. (2020).
Munnik et al. "Recent developments in the synthesis of supported catalysts." Chemical Reviews 115(14): 6687-6718 (2015).
Papageorgiou et al. "Preparation of Pt/γ-Al2O3Pellets with Internal Step-Distribution of Catalyst: Experiments and Theory." Journal of Catalysis 158(2): 439-451 (1996).
Standard Test Method for Determination of Attrition of FCC Catalysts by Air Jet (D5757) ("ASTM Standard").
Russo et al. "Intraparticle Modeling of Non-Uniform Active Phase Distribution Catalyst." ChemEngineering 4(2): 24 pp. 1-15 (2020).
Venuto et al. "Fluid catalytic cracking with zeolite catalysts." Marcel Dekker, Inc. New York. pp. 30-31, 42-47 (1979).
Wu et al., "Catalyst attrition in an ASTM fluidized bed." Catalysis Today 264: 70-74 (2016).
Zhuang et la. "Novel synthesis route for egg-shell, egg-whie and egg-yolk type of cobalt on silica catalysts." Applied Catalysis A: General 301:138-142 (2006).
De Klerk. (2013) "Fischer-Tropsch Process" In Kirk-Othmer Encyclopedia of Chemical Technology, (Ed.). Wiley; p. 6 Section 3.1.

(56) References Cited

OTHER PUBLICATIONS

Aboul-Gheit et al. "The role of additives in the impregnation of platinum and ruthenium on alumina catalysts." Journal of Chemical Technology and Biotechnology 29.8: 480-486 (1979).
Answer to Counterclaims, *G.W. Aru, LLC, et al. v. W.R. Grace & Co.-Conn.*, No. 1:22-cv-02636-JKB (Dist. Ct. North. Div, Md.) Jan. 5, 2023, D.I. 16.
Answer to Counterclaims to First Amended Complaint, *G.W. Aru, LLC, et al. v. W.R. Grace & Co.-Conn.*, No. 1:22-cv-02636-JKB (Dist. Ct. North. Div, Md.) Feb. 16, 2023, D. I. 32.
Argyle et al. "Heterogeneous catalyst deactivation and regeneration: a review." Catalysts 5.1: 145-269 (2015).
Defendant W.R. Grace & Co.-Conn.'s Answer, Affirmative Defenses, and Counterclaims to Plaintiffs' Complaint, *G.W. Aru, LLC, and Cochise Technology, LLC v. W.R. Grace & Co.-Conn.*, No. 1:22-cv-02636-JKB (Dist. Ct. North. Div, Md.) Dec. 22, 2022, D.I. 15.
Defendant W.R. Grace & Co.-Conn's Answer, Affirmative Defenses, and Counterclaims to Plaintiffs' First Amended Complaint, *G.W. Aru, LLC, and Cochise Technology, LLC v. W.R. Grace & Co.-Conn.*, No. 1:22-cv-02636-JKB (Dist. Ct. North. Div, Md.) Jan. 26, 2023, D. I. 25.
Defendant W.R. Grace & Co.-Conn's Opening Claim Construction Brief, *G.W. Aru, LLC, and Cochise Technology, LLC v. W.R. Grace & Co.-Conn.*, No. 1:22-cv-02636-JKB (Dist. Ct. North. Div, Md.) Aug. 21, 2023, D. I. 76 m (uploaded in 3 parts).
Defendant W.R. Grace & Co.-Conn's Responsive Claim Construction Brief, *G.W. Aru, LLC, et al. v. W.R. Grace & Co.-Conn.*, No. 1:22-cv-02636-JKB (Dist. Ct. North. Div, Md.) Sep. 18, 2023, D. I. 95.
Demmel. "Effective use of CO promoter in fluid catalytic cracking operation." Technical article from Intercat Corporation (11 pages).
First Amended Complaint, *G.W. Aru, LLC, et al. v. W.R. Grace & Co.-Conn.*, No. 1:22-cv-02636-JKB (Dist. Ct. North. Div, Md.) Jan. 12, 2023, D. I. 18.
First Amended Complaint, *G.W. Aru, LLC, and Cochise Technology, LLC. v. W.R. Grace & Co.-Conn.*, No. 1:22- CV-02636-JKB (Dist. Ct. North. Div, Md.) Jan. 13, 2023, D. I. 20.
Gavriilidis et al. "Optimal Distribution of Catalyst in Pellet" Catalysis Reviews—Science and Engineering 35 (3):399-456 (1993).
Gues. "Preparation of Supported Catalysts." Catalysis: an integrated approach. Second Ed., vol. 123. Elsevier: 459-485 (1999).
Harold et al. "Impact of the Catalytic Activity Profile on Observed Multiplicity Features: CO Oxidation on PT/Al2O3" Ind. Eng. Chem. Res. 26:1616-1621 (1987).
Joint Claim Construction Statement, *G.W. Aru, LLC, et al. v. W.R. Grace & Co.-Conn.*, No. 1:22-cv-02636-JKB (Dist. Ct. North. Div, Md.) Aug. 7, 2023, D. I. 72.
Lekhal et al. "Predicting the effect of drying on supported coimpregnation catalysts." Industrial & engineering chemistry research 40.18: 3989-3999 (2001).
Luo et al. "Laboratory deactivation testing for the stability of FCC CO combustion promoters." Applied Catalysis B: Environmental 72.3-4: 212-217 (2007).
Memorandum and Order, *G.W. Aru, LLC, et al v. W.R. Grace & Co.-Conn.*, No. 1:22-cv-02636-JKB (Dist. Ct. North. Div, Md.) Oct. 31, 2023, D. I. 110.
Mojet et al. "A new model describing the metal-support interaction in noble metal catalysts." Journal of catalysis 186.2: 373-386 (1999).
Muroi. "Role of Precious Metal Catalysts." Noble Metals, IntechOpen: 301-334 (2012).
Original Complaint, *G.W. Aru, LLC and Cochise Technology, LLC v. W.R. Grace & Co. Conn.*, No. 1:22-cv-02636-JKB (Dist. Ct. North. Div, Md.) Oct. 13, 2022, D.I. 1.
Opening Expert Report of Dr. Michael Harold Regarding Invalidity of U.S. Pat. No. 11,224,864, *G.W. Aru, LLC, et al. v. W.R. Grace & Co.-Conn.*, No. 1:22-cv-02636-JKB (Dist. Ct. North. Div, Md.) Aug. 12, 2024, D.I. 180-37.
Patent Owner's Preliminary Response to Petition for Inter-Partes Review of U.S. Pat. No. 11,224,864 and Declaration of Dr. Carpenter. IPR2023-01063 (Sep. 21, 2023).
Petition for Inter Partes Review of U.S. Pat. No. 11,224,864 and Declaration of Dr. Harold. IPR2023-01063 (Jun. 15, 2023).
Pinna. "Supported metal catalysts preparation." Catalysis Today 41.1-3: 129-137 (1998).
Plaintiffs' Opening Claim Construction Brief, *G.W. Aru, LLC, et al. v. W.R. Grace & Co.-Conn.*, No. 1:22-cv-02636-JKB (Dist. Ct. North. Div, Md.) Aug. 21, 2023, D. I. 77 (uploaded in three parts).
Plaintiffs' Responsive Claim Construction Brief, LLC and Cochise Technology, *G.W. Aru, LLC, et al. v. W.R. Grace & Co.-Conn.*, No. 1:22-cv-02636-JKB (Dist. Ct. North. Div, Md.) Sep. 18, 2023, D. I. 96.
Ruckenstein et al. "Redispersion of platinum crystallites supported on alumina-Role of wetting." Journal of Catalysis 59.1: 109-122 (1979).
Sadeghbeigi. Fluid catalytic cracking handbook: An expert guide to the practical operation, design, and optimization of FCC units. Butterworth-Heinemann, 3rd Edition (2012).
Shyr et al "Preparation of Nonuniformly Active Catalysts" J of Catalysis 63:426-432 (1980).
Tang et al. "High resolution electron microscopy study of nano structure in CO emission control additives." Technical article from Intercat-Johnson Matthey R&D.
Tian et al. "The oxidation of tetralin and its effect on the stability of fluidized catalytic cracked diesel." Energy & fuels 18.1: 49-53 (2004).
Transcript of Claims Construction Hearing on Oct. 3, 2023, *G.W. Aru, LLC, et al. v. W.R. Grace & Co.-Conn.*, No. 1:22-cv-02636-JKB (Dist. Ct. North. Div, Md.) Oct. 26, 2023, D. I. 107.
Van Santen. "Physical chemistry, elementary kinetics." Modern heterogeneous catalysis: an introduction, John Wiley & Sons: 59-116 (2017).
Woltermann et al. "Commerical Preparation and Characterization of FCC Catalysts" Chapter 4 in Fluid Catalytic Cracking: Science and Technology (1993).
W.R. Grace & Co.-Conn's Cross-Motion for Summary Judgment and Response In Opposition to Plaintiffs' Motion for Partial Summary Judgment, *G.W. Aru, LLC, and Cochise Technology, LLC v. W.R. Grace & Co.-Conn.*, No. 1:22-CV-02636-JKB (Dist. Ct. North. Div, Md.) Sep. 6, 2024, D. I. 189.
Decision Denying Institution of Inter Partes Review of U.S. Appl. No. 11/224,864. IPR2023-01063, D. I. 121-1 (Dec. 11, 2023).
Rebuttal Expert Report of Dr. Everett Carpenter to the Opening Expert Report of Dr. Michael Harold Regarding Alleged Invalidity of U.S. Pat. No. 11,224,864, *G.W. Aru, LLC, et al. v. W.R. Grace & Co.-Conn.*, No. 1:22-cv-02636-JKB (Dist. Ct. North. Div, Md.) Aug. 12, 2024, D. I. 180-39.

\* cited by examiner

CO TO $CO_2$ COMBUSTION PROMOTER

CROSS-REFERENCE TO RELATED APPLICATIONS

This application is a divisional under 35 U.S.C. § 121 of U.S. Application Ser. No. 17/556,102 filed Dec. 20, 2021, which is a divisional under 35 U.S.C. § 121 of U.S. application Ser. No. 17/176,222 filed Feb. 16, 2021 issued as U.S. Pat. No. 11,224,864 on Jan. 18, 2022, which is a continuation under 35 U.S.C. § 120 of U.S. application Ser. No. 17/043,031 filed Sep. 29, 2020 and, which is a 35 U.S.C. § 371 National Phase Entry Application of International Application No. PCT/US2019/024742 filed Mar. 29, 2019, which designates the U.S. and claims benefit under 35 U.S.C. § 119(a) of N.L. Provisional Application No. 2020819 filed Apr. 24, 2018 and under 35 U.S.C. § 119(e) of U.S. Provisional Application No. 62/651,295 filed Apr. 2, 2018, the contents of which are incorporated herein by reference in their entireties.

FIELD OF THE INVENTION

The invention is directed to a CO to $CO_2$ combustion promoter comprising microsphere sized porous alumina particles comprising one or more Group VIII noble metals.

BACKGROUND OF THE INVENTION

Such CO to $CO_2$ combustion promoters are well known and are used in a fluid catalytic cracking (FCC) unit. In such a FCC process fluidizable catalyst particles are contacted in a conversion zone at high temperatures with hydrocarbons such to crack higher boiling hydrocarbons to lower boiling hydrocarbons, typically boiling in the gasoline range. The catalyst may be a crystalline zeolitic aluminosilicate component, usually an ion-exchanged form of a synthetic crystalline Faujasite, and a porous inorganic oxide matrix. This type of catalyst must be regenerated to low carbon levels, typically 0.5% or less, to assure that the catalyst particles possess desired activity and selectivity before the particles are recycled to the conversion zone, also referred to as cracking zone. In most regenerators the combustible solids deposited on the spent solid catalyst particles from the cracking zone are burned in a confined regeneration zone in the form of a fluidized bed which has a relatively high concentration of catalyst particles (dense phase). A region of lower solids concentration (dilute phase) is maintained above the dense phase.

High residual concentration of carbon monoxide in flue gases from regenerators has been a problem. The oxidation of carbon monoxide is highly exothermic and can result in so-called "carbon monoxide afterburning" which can take place in the dilute catalyst phase, in the cyclones or in the flue gas lines. Afterburning has caused significant damage to plant equipment. CO to $CO_2$ combustion promoters are added to the FCC catalyst inventory of the regenerator with the objective to achieve a complete combustion of carbon monoxide in the regenerator dense phase and thereby avoiding this afterburning. The combustion promoters are separate particles from the cracking catalyst particles. The combustion promoters will be circulated with the rest of the FCC catalyst inventory from the regenerator to the riser, to the stripper and back to the regenerator.

Such CO to $CO_2$ combustion promoters are commonly made from impregnation of Group VIII noble metal or metals, commonly platinum and/or palladium, onto a porous alumina and/or other substrate microspheres of average particle size 60 to 90 microns, with physical properties very similar to the base FCCU catalysts. Such impregnation results in a uniform distribution of the Group VIII noble metal throughout the internal and external surfaces of the porous microsphere.

EP1879982 describes a CO to $CO_2$ combustion promoter for use in FCC containing platinum or palladium predominately present in the core of the particle and a metal active for catalysing NOx decomposition in a shell around the platinum or palladium.

US2005/0042158 describes a CO to $CO_2$ combustion promoter for use in FCC containing cerium oxide and a noble metal, like platinum and/or rhodium.

Other background publications are U.S. Pat. No. 6,165,933, US2005042158, U.S. Pat. Nos. 4,812,431, 4,300,997.

A disadvantage of all noble metal based CO to $CO_2$ combustion promoters is that relatively large amounts of noble metal are required to achieve the desired CO combustion in the FCC process. It is an objective of the present invention to provide a CO to $CO_2$ combustion promoter which requires less noble metal to achieve the same level of CO combustion in the FCC process.

SUMMARY OF THE INVENTION

This is achieved with the following CO to $CO_2$ combustion promoter. A CO to $CO_2$ combustion promoter comprising microsphere sized porous silica and/or alumina comprising particles further comprising one or more Group VIII noble metals wherein the noble metal is distributed in the particle as an eggshell such that a higher content of noble metal is present in the outer region of the particle as compared to the content of noble metal in the center of the particle. In one aspect of any of the embodiments, described herein is a CO to $CO_2$ combustion promoter comprising a particle, e.g., spherical particle, comprising i) silica and/or alumina and ii) one or more Group VIII noble metals, wherein the one or more noble metals is distributed in the particle in a gradient, with the concentration of each noble metal increasing toward the outer surface of the particle relative to the center of the particle. In some embodiments, the particles are less than 1 mm across the largest dimension, e.g., they are microspheres. The concentration of the noble metal can be zero, or any detectable concentration at the lowest point of the gradient. The concentration of the one or more noble metals can increase along the gradient at a constant or inconstant rate. In some embodiments, the particle can comprise two regions—a first inner region not comprising the one or more noble metals or a very low concentration of such metals and a second outer region, referred to herein as an "eggshell" comprising the one or more noble metals.

In one aspect of any of the embodiments, described herein is a CO to $CO_2$ combustion promoter comprising a particle, e.g., spherical particle, comprising i) a first region comprising porous silica and/or alumina and ii) a second region comprising the surface of the particle and (eggshell) comprising one or more Group VIII noble metals, wherein the concentration of one or more noble metals is greater in the second region than in the inner region and/or than in the pores of the inner region. In some embodiments, the particles are less than 1 mm across the largest dimension, e.g., they are microspheres. The concentration of the noble metal can be zero, or any detectable concentration in the first region or in the pores of the first region.

Applicants found that the CO to $CO_2$ combustion promoter was active as combustion promoter while the combustion promoter itself contained almost only the Group VIII noble metal in an eggshell of the particle. Thus the same activity could be achieved using essentially significantly less noble metal per particle. Without wanting to be limited by the following theory applicants believe that the presence of the noble metal in the outer eggshell of a microsphere particle is sufficient to achieve an active combustion promoter. This is because the CO to $CO_2$ oxidation as catalyzed by a Group VIII noble metal is a very rapid, essentially instantaneous, reaction at the FCC regenerator temperatures of approximately 704° C. (1,300° F.) which is known as a diffusion limited or a mass-transfer limited reaction. Thus, the noble metal in the center of the particle is not active for CO to $CO_2$ oxidation as the reactant gases (CO and $O_2$) react before reaching this noble metal.

A further advantage with the eggshell of noble metal is that less NOx formation is achieved. This may be explained as follows. NOx forming reactions are slower and thus less diffusion limited than the CO to $CO_2$ reactions. Thus, the prior art combustion promoters having a uniform distribution and higher loading of the noble metal will generate more NOx as this additional noble metal will catalyse NOx forming reactions.

Further, it is known the noble metal will sinter in time making the combustion promoter less active for CO to $CO_2$ oxidation. The sintered particle will, however, still remain in the catalyst inventory of a FCC unit and continue to catalyse the NOx forming reactions. It has been reported that the sintered noble metal even promotes the NOx forming reactions better than the fresh-non-sintered noble metal. The sintered metal within the entire particle will promote the NOx forming reactions because these reactions are less diffusion limited. The noble metal of the combustion promoters according to the invention will also sinter. But because such a particle will contain considerably less noble metal the catalytic activity for the NOx forming reaction of such degraded combustion promoters will be less compared to the degraded combustion promoters of the prior art.

DETAILED DESCRIPTION OF THE INVENTION

Figure 1:
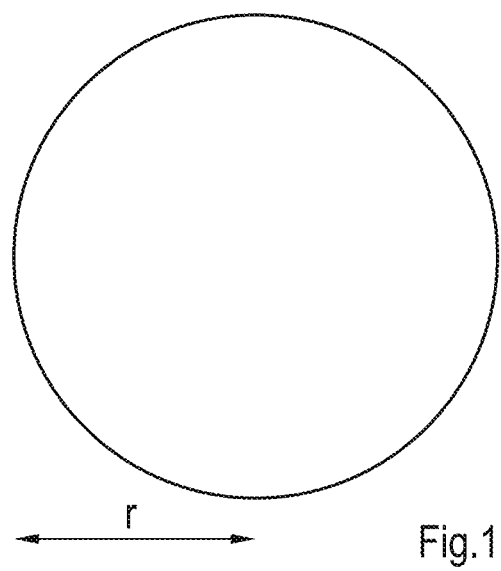
FIG. 1 shows a cross-section of a state of the art combustion promoter.

In this description the following terms are used having the following definition.

FCC process: process to crack heavy oil fractions to lighter oil fractions by contacting the heavy oil fraction in a riser reactor where the heavy oil cracks to lighter oil in the presence of hot FCC catalyst inventory and deposits coke on the FCC catalyst inventory, by separating light oil fractions from the catalyst inventory by means of cyclones and by stripping and wherein coke is removed from the catalyst inventory by combustion in a regenerator to obtain a flue gas and hot catalyst inventory for reuse in the riser.

FCC Unit: Installation comprising of a riser, a stripper and a regenerator and means to circulate FCC catalyst inventory from the riser to the stripper and to the regenerator and back to the riser.

FCC catalyst inventory or catalyst inventory: the total of solid particles comprising of FCC catalyst and additives which are circulated from the regenerator to the riser, to the stripper and back to the regenerator.

FCC catalyst: a silica-alumina comprising particle comprising a zeolite.

Spent FCC catalyst: deactivated FCC catalyst obtained from a FCC process containing coke depositions.

Equilibrium FCC catalyst: mixture of active and deactivated FCC catalyst representing an average activity of a stable running FCC process.

Eggshell catalysts are known for larger catalyst particles. Applicant now discovered that it is possible to also form such an eggshell distribution on microsphere sized porous particles. The microsphere sized particles suitably have an average (D50) size of between 60 and 90 micron as measured by laser light scattering, also referred to as laser diffraction, using for example a Malvern Mastersizer 3000.

The eggshell or outer shell suitably has a depth from the outer surface towards the interior of the particle of between 1 to 10 microns. In this eggshell, which includes the outer surface of the particle, suitably more than 60 wt %, suitably more than 80 wt % and even more suitably more than 90 wt % of the noble metal is present of the total of noble metal present in the particle.

The silica and/or alumina comprising particle of the CO to $CO_2$ combustion promoter may be a particle based on a predominately only silica particle. Examples of suitable silica particles are spray dried silica particles. Such a silica particle may be impregnated as described here below with the noble metal or metals to obtain the promoter according to the invention.

The silica and/or alumina comprising particle of the CO to $CO_2$ combustion promoter may also be a particle comprising both alumina and silica. Suitable examples of such particles are FCC catalyst particles which may comprise between and 70 wt % alumina, between 35 and 70 wt % silica. Such particles will also comprise of a zeolite, suitably Faujasite or Type Y zeolite, and/or ZSM-5, and binders such as silica sol, alumina sol, pseudo-boehmite alumina or a clay-based matrix. Suitably equilibrium FCC catalyst particles or spent FCC catalyst particles are used as obtained from a fluidized catalytic cracking (FCC) process. The equilibrium or spent FCC catalyst is obtained from a FCC process wherein fresh FCC catalyst has deactivated to some degree. Such catalyst particles may thus find a suitable second use as CO to $CO_2$ combustion promoter. By impregnating the FCC catalyst particles as described here below with the noble metal or metals the promoter according to the invention may be obtained.

The silica and/or alumina comprising particle of the CO to $CO_2$ combustion promoter is suitably an alumina particle and more preferably a gamma or theta alumina particle. Such an alumina starting particle may consist of predominately only alumina, suitably resulting in a CO to $CO_2$ combustion promoter wherein the support, thus excluding the noble metals, has an alumina content of above 95 wt % and more preferably above 99 wt %. The starting gamma or theta alumina particles suitably have an average (D50) size of between 60 and 90 micron, have a surface area (BET) of between 50 and 300 m$^2$/g and preferably between 50-150 m$^2$/g and a pore volume of between 0.05 and 0.50 mL/g and preferably between 0.10-0.40 mL/g. Examples of suitable starting alumina particles are obtainable from Sasol, such as Puralox and Catalox. Such starting alumina particles may be impregnated as described here below with the noble metal or metals to obtain the promoter according to the invention.

The Group VIII noble metal is suitably platinum, palladium, iridium, ruthenium and/or rhodium. Platinum can be preferred because of its availability. Palladium and rhodium can be preferred because they promote the NOx forming reactions less than platinum. A problem in prior art devices is their availability. Because the combustion promoter according to the inventions requires less noble metal for achieving the same activity noble metals like palladium and rhodium may be practically applied.

The average content of noble metal per grams of combustion promoter may range from 1 to 5000 ppm and preferably between 100 and 1500 ppm. Locally, in the eggshell, this concentration will of course be larger. The concentration of noble metal in the eggshell may suitably be in the same range as the concentration of noble metal in the prior art combustion promoters which have the noble metal evenly distributed within the particle. The optimal content of noble metal will depend on their catalytic activity for promoting the CO to $CO_2$ combustion, wherein it is known that platinum is very active and will thus require a lower content than for example palladium which is known to be less active.

The concentration of the noble metal on the support is typically very low. To establish whether the metals are homogeneously distributed or present as an eggshell it is possible to use Low Electron Ion Scattering. This technique (Platinum Metals Rev., 2010, 54, (2), 81 87) can establish surface concentrations already at 0.01 at %, which is in the applicable range. By combining this surface technique together with a bulk chemical analysis technique such as X-ray fluorescence (XRF) or inductively coupled plasma (ICP) it can be established whether the surface is enriched in noble metal, and the metal is predominantly present as an eggshell. For example, if the concentration at the surface is 2 times as high as the bulk concentration using a technique that has a penetration depth of 10 micron, the metal distribution is predominantly at the surface and hence is considered an eggshell type distribution.

The combustion promoter may comprise co-catalytical compounds as for example known for prior art combustion promoters. For the example cerium oxide which may be added to provide oxygen storage or copper oxide to reduce NOx forming reactions. Such co-catalyst compounds are preferably present in the eggshell comparable to the noble metal distribution in the particle. Preferably cerium oxide is distributed in the particle as an eggshell such that a higher content of cerium oxide is present in the outer region of the particle as compared to the content of cerium oxide in the centre of the particle. Accordingly, in some embodiments, described herein is a CO to $CO_2$ combustion promoter comprising a particle (e.g., spherical particle) comprising i) silica and/or alumina and ii) one or more Group VIII noble metals and one or more co-catalytical compounds, wherein the metals and compounds of ii) are distributed in the particle in a gradient, with the concentration of each noble metal and co-catalytical compound increasing toward the outer surface of the particle relative to the center of the particle. In some embodiments, the particle can comprise two regions—a first inner region not comprising the one or more noble metals and a second outer region, referred to herein as an "eggshell", comprising the one or more noble metals and one or more co-catalytical compounds.

Typically, the sensitivity to attrition of the CO to $CO_2$ combustion promoter particles is about the same or even better than the FCC catalyst inventory to which the promoter particles are added. Applicants have now found that it is advantageous to use CO to $CO_2$ combustion promoter particles which have a higher sensitivity to attrition than the typical FCC catalyst. The advantage is that in this way deactivated CO to $CO_2$ combustion promoter particles comprising sintered noble metal or metals will reduce in size, by for example wear or fracture, quicker than in the prior art processes. The smaller sized CO to $CO_2$ combustion promoter particles will subsequently be removed from the FCC process via the flue gas leaving the FCC regenerator. These fines in the flue gas may be suitably removed from the flue gas by means of advance external particulate emissions control devices such as Electro-Static Precipitators (ESP) or wet-gas scrubbers. In this way the content of deactivated CO to $CO_2$ combustion promoter containing sintered noble metals in the FCC catalyst inventory will be lower than when promoter particles are used having a lower sensitivity to attrition. This results in turn in less NOx forming because the content of particles with sintered noble metal or metals is lower. See also the explanation regarding NOx formation above. The sensitivity may be expressed in the so-called Attrition Index as measured according to ASTM D-5757. The Attrition Index of the CO to $CO_2$ combustion promoter for a sieve fraction of combustion promoter particles of between 40 and 105 micron is preferably between 5 and 25 and more preferably between 10 and 20. Preferably this Attrition Index of the CO to $CO_2$ combustion promoter is higher than the Attrition Index of the FCC catalyst itself. FCC catalyst particles typically have a sensitivity to attrition which results in that the average catalyst residence time of the FCC catalyst in a FCC unit is between 2 weeks and 2 months. The residence time is an average residence time. The residence time of individual particles varies greatly when one realises that typically on a daily basis catalyst is added and withdrawn and partially lost to attrition in a FCC Unit.

The higher sensitivity to attrition of the CO to $CO_2$ combustion promoter preferably results in that an average residence time of less than 5 days, more preferably less than 3 days and even more preferably less than one day in the FCC catalyst inventory. Even shorter residence times will reduce NOx emissions even further. For the lowest NOx emissions at reasonable expenses, a residence time of half a day, or a quarter of a day would be considered optimal. At these lower residence times significant amounts of partially active combustion promoter will be lost as fines resulting in that more fresh CO to $CO_2$ combustion promoter will be required to be added to the catalyst inventory. The skilled person will be able to find the optimal Attrition Index for the CO to $CO_2$ combustion promoter depending for example on the desired residence time and the influence of the FCC unit itself to the attrition of the FCC catalyst inventory. This process of finding the optimal Attrition Index may for example be an empirical iteration, where the attrition resistance of the additive is lowered (attrition increased) until the NOx emissions are lowered, and further reduction in the attrition resistance requires an increase in the addition rate of the combustion promoter. In a FCC process the aged CO to $CO_2$ combustion promoter will be removed from the process as fines and together with the catalyst purge which removes a part of the catalyst inventory from the FCC process. When the CO to $CO_2$ combustion promoter particles having the lower residence times than the 2 weeks and 2 months for FCC catalysts are used as described above it is preferred that more than 70 wt % of the CO to $CO_2$ combustion promoter as added to the process is removed as fines together with the flue gas wherein any remainder may be removed from the catalyst inventory by means of a catalyst withdrawal of the FCC catalyst inventory.

Applicant believe that being able to influence, i.e. lower, the residence time of part of the FCC catalyst inventory by increasing the sensitivity to attrition is novel and may also be applied in an inventive manner for other FCC additives and even for FCC catalyst itself. Catalyst and additives used in the FCC process have always been designed with physical properties such as density and attrition that maximize the retention of the catalyst or additive in the circulating FCC catalyst inventory. Such retention characteristics have been designed for these catalyst and additives irrespective of the life or half-life of the intended catalytic function of the individual additives or catalyst and without consideration for any detrimental effects such aged additives and/or FCC catalysts may have when left in the FCC catalyst inventory. By influencing the sensitivity to attrition of the additives, such as CO combustion promoters, and/or FCC catalyst one has a means to minimise these detrimental effects of the aged additives and/or catalyst.

Next to the earlier described CO to $CO_2$ combustion promoter, it may be preferable that other FCC additives may also have a higher sensitivity to attrition than the FCC catalyst. Propylene enhancing additives based on medium pore zeolites, such as ZSM-5, is initially more selective to propylene production but becomes more butylene selective as it ages due to dealumination. Such additives are well known and for example described in Magee and Mitchell (editors), Studies in Surface Science and Catalysis vol. 76, Elsevier Amsterdam 1993. Both the fresh ZSM-5 based additive and the deactivated additive are in competition in the FCC catalyst inventory for the same feed molecules to crack. Therefore, the presence of (partially) deactivated ZSM-5 reduces the overall propylene selectivity and enhances the butylene selectivity. For maximum propylene selectivity it is advantageous to limit the residence time of the ZSM-5 based additive in the FCC catalyst inventory to below 7 days, more preferred below 5 days and even more preferred to below 3 days. The residence time may suitably be established using chemical markers. For example, when to catalysts are added each at 5 tons per day to an FCC unit, with an inventory of 100 tons, the average residence time in inventory would be when all physical properties are equal $100/(5+5)=10$ days. When one of the catalysts or additives is provided with a chemical marker, and only half of that marker is present in the catalytic inventory, that means the residence time is half of the average residence time of the total inventory, i.e. 5 days.

Y zeolite used in FCC catalysts and in some FCC additives may lose their hydrogen transfer capability and other desirable properties as they age, going through various phases of reduced and/or undesirable catalytic functionality until they finally become catalytically inert. By choosing a suitable Attrition Index for such Y zeolite based FCC catalyst particles and/or Y zeolite based additives one may avoid such reduced and/or undesirable catalytic functionality of the aged particles. This is because their residence time is reduced.

The invention is also directed to a FCC process wherein one or more FCC catalysts and/or FCC additives in the catalyst inventory have a shorter residence time in the catalyst inventory than the residence time of a more catalytically stable FCC catalysts and/or FCC additives and wherein the one or more FCC catalysts and/or FCC additives in the catalyst inventory having a shorter residence time are more than 70 wt % removed from the process as fines in the flue gas shorter while the remainder is removed from the FCC process via a catalyst withdrawal of part of the FCC catalyst inventory.

The invention is also directed to a FCC process wherein one or more FCC catalysts and/or FCC additives in the catalyst inventory have a shorter residence time in the catalyst inventory than the residence time of a more catalytically stable FCC catalysts and/or FCC additives and wherein the shorter residence time is a result of a higher sensitivity to attrition of said FCC catalysts and/or FCC additives as compared to the sensitivity to attrition of the more catalytically stable FCC catalysts 25 and/or FCC additives.

The invention is also directed to a FCC unit comprising a catalyst inventory comprising:
  a. a first FCC catalyst, and
  b. a second FCC catalyst and/or additive having a catalytic active component having a catalytic activity,
  whereby the catalytic activity of the second FCC catalyst and/or additive is negatively altered by the effects on the catalytically active component, whereby the second FCC catalyst and/or additive is more sensitive to attrition and has a shorter residence time in the catalyst inventory as compared to the first FCC catalyst.

In the above FCC unit the additive may be a CO to $CO_2$ combustion promoter, more specially a CO to $CO_2$ combustion promoter wherein at least one of the catalytically active components of the additive comprises a metal and wherein the catalytic effect of the metal is negatively altered by sintering of the metal. The metal or metals may be as described above for the promoter according to the invention. The metal may be distributed homogenously or according to a gradient. The promoter is preferably a CO to $CO_2$ combustion promoter is a CO to $CO_2$ combustion promoter according to this invention. The additive may also be ZSM-5 or a ZSM-5 comprising additive and wherein the catalytic effect of the ZSM-5 is negatively altered by dealumination of the zeolite.

The CO to $CO_2$ combustion promoter having a gradient in metal content may be obtainable by known processes to prepare eggshell type of catalysts as for example described in WO2016/151454. The CO to $CO_2$ combustion promoter is suitably obtainable by a process comprising the following steps (a) introducing a medium in the pores of starting porous silica and/or alumina comprising particles to obtain filled porous particles and (b) contacting the filled porous particles with an aqueous salt solution of the Group VIII noble metal or metals wherein the Group VIII noble metal deposits predominantly in in the outer region of the particles thereby obtaining intermediate eggshell particles and optionally (c) dry and/or calcine the intermediate eggshell particles. The invention is also directed to this process as such.

The starting porous silica and/or alumina comprising particles may be the aforementioned starting porous particles described above.

By introducing a medium which does not contain a Group VIII noble metal or noble metal salt in step (a) the pores of the porous alumina particle and especially the pores in the centre of the porous silica and/or alumina comprising particle will be filed with this medium. When the obtained filled porous particle is contacted in step (b) with an aqueous salt solution of the Group VIII noble metal or metals the pre-filled pores in the centre of the particle will be more difficult to reach. This results in that the noble metal is deposited predominately in the eggshell of the particle.

The medium in such a process may be water, an oil, a solvent for the noble metal salt or a liquid in which the noble metal salt barely dissolves. It is understood that the medium preferably does not contain the noble metal or its salt to avoid that noble metal deposits in the centre of the particle. The water may contain other additives which suitably do not deposit on the alumina surface of the pores. Such additives may be gel-forming additives which make it even more difficult for the aqueous salt solution of the Group VIII noble metal or metals to enter the pores in the centre of the particle. Alternatively, the filled porous particles may be reduced in temperature such that the water in the pores solidifies. When such a particle is contacted in step (b) with the aqueous salt solution of the Group VIII noble metal or metals the deposition of metals will take place in the eggshell where any frozen water will first melt and not in the pores which contain the frozen water which will melt at a later moment in time.

For performing step (a) it is important to know the volume of the pores of the starting porous silica and/or alumina comprising particles, also referred to as the support, which are to be filled with medium. The pore volume may be measured using nitrogen and/or quick porosimetry to measure micro-, meso- and macro-pore volumes. A preferred method is to establish the "water pore volume". In this the particles are fully soaked in excess water. With the aid of a laboratory centrifuge the excess water that is not contained in the pores is removed. The difference in weight of the water equals the pore volume as occupied by the water. When no centrifuge is available, the pore volume can be established by adding water drop wise to a dry powder. The powder is well mixed during the addition of water. The moment when the powder no longer adsorbs the water and mixing of the place where the drop impacted with dry parts of the powder, the powder is considered to be fully saturated. This method is comparable to the incipient wetness technique but is now used to establish the pore volume of the support.

In step (a) the support is pre-contacted with a liquid medium, preferably water. The liquid can be a solvent for the salt, such as water, or a non-solvent, such as paraffinic oil. The quantity of the added medium is suitably between 50 and 100 vol % of the pore volume of the support, as established in the steps mentioned above. More preferred the quantity of the added medium is at least 60% and even more preferred is at least 70% of the pore volume of the support. Higher than 80% filling of the pores will be possible, but this does require skill and careful execution to homogeneously distribute the liquid. Pre-filling the pores to 90%, or even up to 95% will help to achieve the highest activity for the noble metal but will require a careful execution of the pre-contacting step. A 100 vol % filing is preferred when one desires to only deposit noble metals on the outer surface of the particle. The key here is the slow addition of the liquid medium to the support while mixing and/or agitating the support. An alternative can be condensation of the pre-contacting liquid in the pores, using the appropriate partial pressures to fill a certain fraction of the pores. The pre-contacting liquid can potentially be solidified via the addition of a gelling agent, by lowering the temperature, potentially even freezing the pre-contacting liquid in the pores, or a combination of both. Another method of adding the medium is to saturate the particles in a fluid bed in a stream containing the medium, where the medium can condense in the pores. The medium will be homogeneously distributed in this way over all the particles.

The higher the fraction of pores filled in the initial liquid medium the more the noble metal will be concentrated on an outer eggshell resulting in a more active combustion promoter. The noble metal salt will be added in the remainder of the pore volume in step (b). For example, when 80 vol % of the pores are filled with the liquid medium, at most 20 vol % of pores can be filled with the noble metal solution. When the total of the 20 vol % of the remaining pore volume is used to add the noble metal this method resembles a two-step incipient wetness technique. If less than all the pore volume is used to add the noble metal, the method resembles a two-step pore volume impregnation.

Contacting in step (b) may be performed by state of the art methods known for depositing metals on the surface of silica and/or alumina comprising particles and the surface of the pores of the silica and/or alumina comprising particles. In this method the salt solution of the Group VIII noble metal is added in about the same volume as the remaining pores to be filled with the salt solution. In step (b) of the present process the filled porous particles are contacted with a volume of the aqueous salt solution of the Group VIII noble metal or metals which is less than the total volume of the pores of the porous silica and/or alumina comprising particles. This because the pore volume in the centre of the particles is already filled with the medium. In this manner only the pores in the outer shell of the particle, i.e. the eggshell, are filled with the aqueous salt solution and the noble metal predominately deposit in the eggshell of the particle. The contact time in step (b) is preferably at most 30 minutes, more preferred at most 20 minutes, even more preferred at most 10 minutes. Contact times of at most 5 minutes or even at most 3 minutes may be even more preferred. For example, a one minute contact time could be suitable when the pores are filled for 100 vol %. The impregnated particles and the aqueous salt solution may be separated by means of filtration, for example using a filter, covered with a filter cloth to contain the small support particles. The filtration may be performed by means of a filter press, a belt filter or any other filtration device suitable to separate the quantity of catalyst prepared from the liquid slurry. The filtrate may contain noble metal salts which are suitably recovered and reused to contact a next batch of filled porous particles.

In step (c) the particle containing the deposited noble metal as obtained in step (b) may be optionally dried and/or calcined. Drying suitably takes place at temperatures between 100 to 250° C. (212 to 482° F.) and calcination suitably takes place at a temperature of between 250 and 750° ° C. (482 to 1382° F.). Drying and/or calcination may be with or without vacuum. Drying is preferred to limit sintering of the noble metal or metals.

Prior to or after performing steps (a)-(b) the starting silica and/or alumina comprising particles or impregnated particles can also be subjected to a process comprising steps (a)-(c) wherein in step (b) the filled porous particles are contacted with an aqueous salt solution of a cerium salt instead of the aqueous salt solution of the Group VIII noble metal or metals Group VIII noble metal to obtain particles in step (c) comprising cerium oxide which is distributed in the particle as an eggshell such that a higher content of cerium oxide is present in the outer region of the particle as compared to the content of cerium oxide in the centre of the particle.

The invention is also directed to the use of the CO to $CO_2$ combustion promoter as described above in a fluid catalytic cracking (FCC) unit.

DETAILED DESCRIPTION OF THE FIGURES

FIG. 1 shows a state of the art combustion promoter where the Group VIII metal is distributed homogeneously throughout an alumina microspheres of average particle size 60 to 90 microns (twice the radius r). The alumina support has mesopores (pores less than 50 nanometers) distributed throughout the particle. The capillary effects, both hydraulic and evaporative, in mesopores are well documented and are characterized by extremely rapid uptake of any liquid, including one with dissolved noble metal salts. This rapid uptake into the pores of the support is what results in the homogenous distribution of the noble metals with the impregnation methods previously employed and documented to manufacture FCC CO combustion promoters.

Figure 2:
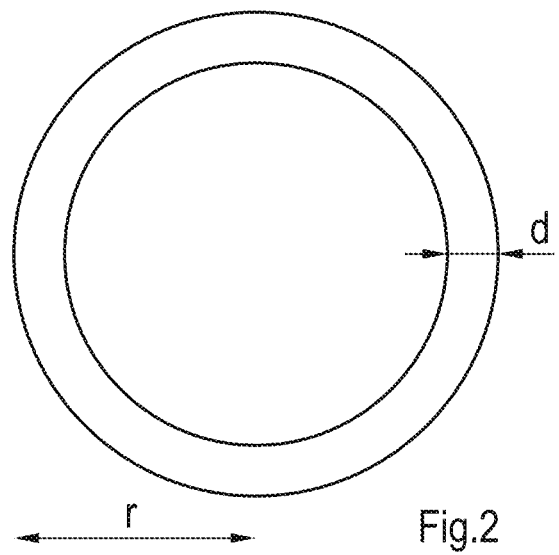
FIG. 2 shows a cross-section of a combustion promoter according to the invention.

FIG. 2 shows a combustion promoter as prepared according to process of the invention. The alumina microsphere has the same dimension and mesopore structure as the alumina microsphere of FIG. 1. The core of the particle contains little to no Group VIII metals and an outer eggshell which may have a thickness (d) of between 1 to 10 microns will contain almost all of the Group VIII metal.

The invention will be illustrated by means of the following non-limiting examples.

Example 1

A two-step impregnation was carried out using a high purity gamma alumina support as purchased from Sasol. In the first step, 10 g of alumina powder was impregnated with water to fill 90% of the pore volume. At a pore volume of 0.5 mL/g, 4.5 mL of water was required for 10 g of alumina powder. For the second step, the wet alumina particles from step 1 with 90% of the pore volume filled with water were impregnated with a solution of palladium nitrate and dried to achieve an eggshell of palladium on the particle surface. The second impregnation step was completed before the pre-filled alumina particles were dried. After completing both impregnation steps, the impregnated particles were calcined at 600° C. for 1 hour to form a particle with the composition in accordance with this invention.

Example 2

0.1 g of the composition of Example 1 was mixed with 10 g of a commercial FCC catalyst. The mixture was then used to measure the oxidation of CO in a fluid bed reactor fitted with a thermocouple. The catalyst bed was heated to 600° C. prior to the start of $CO/O_2$ flow. Oxidation response was measured using a mixture of 1.8 v/v % CO and 0.9 v/v % $O_2$, balanced with He, under a gas flow rate of 1000 cc/min. The oxidation response is a measure of the amount of CO which is combusted (oxidized) to $CO_2$.

Comparative Experiment A

Example 2 was repeated using a state of the art FCC combustion promoter containing twice the amount of palladium as compared to the promoter of Example 1. In the state of the art FCC combustion promoter palladium was homogenously distributed over the particle. The CO oxidation response for the composition of Example 1 was comparable to the state of the art FCC combustion promoter despite having half the palladium loading.

Comparative Experiment B

Example 2 was repeated using a lab prepared FCC combustion promoter with the same palladium loading as in Example 1 and prepared by standard homogeneous impregnation method. This resulted in a homogeneous distribution of palladium throughout the alumina support. The CO oxidation response for the composition of Example 1 was better than the lab prepared FCC combustion promoter.

Example 3

A two-step impregnation was carried out using a high purity gamma alumina support as purchased from Sasol. In the first step, 10 g of alumina powder was impregnated with water to fill 90% of the pore volume. At a pore volume of 0.5 mL/g, 4.5 mL of water was required for 10 g of alumina powder. For the second step, the wet alumina particles from step 1 with 90% of the pore volume filled with water were impregnated with a solution of platinum nitrate and dried to achieve an eggshell of platinum on the particle surface. The second impregnation step was completed before the pre-filled alumina particles were dried. After completing both impregnation steps, the impregnated particles were calcined at 600° C.

Example 4

Example 2 was repeated using 0.1 g of the composition of Example 3.

Comparative Experiment C

Example 4 was repeated using a state of the art FCC combustion promoter containing twice the amount of platinum as compared to the promoter of Example 3. In the state of the art FCC combustion promoter, platinum was homogenously distributed throughout the particle. The CO oxidation response for the composition of Example 3 was comparable to the commercial FCC combustion promoter despite having half the platinum loading.

Comparative Experiment D

Example 4 was repeated using a lab prepared FCC combustion promoter with the same platinum loading as in Example 3 and prepared by standard homogeneous impregnation method. This resulted in a homogeneous distribution of platinum throughout the particle. The CO oxidation response for the composition of Example 3 was better than the lab prepared FCC combustion promoter.

Example 5

Three alumina supports with varying attrition indices were provided by catalyst manufacturers. The attrition index of the three alumina supports ranged from 2 to 25 as measured according to ASTM D-5757. A two-step impregnation was carried out for each of the three as supplied alumina powders. In the first step, 10 g of alumina powder was impregnated with water to fill 90% of the pore volume. At a pore volume of 0.5 mL/g, 4.5 ml of water was required for 10 g of alumina powder. For the second step, wet alumina particles with 90% of the pore volume filled with water were impregnated with a solution of palladium nitrate and dried to achieve an eggshell of palladium on the particle surface. The second impregnation step was completed before the pre-filled alumina particles were dried. After completing both impregnation steps, the impregnated particles were calcined at 600° C. for 1 hour to form a particle with the composition in accordance with this invention.

Example 6

0.1 g of each of the compositions of Example 5 was mixed with 10 g of a commercial FCC catalyst to prepare 3 different mixtures. Each mixture was then used to measure the oxidation of CO in a fluid bed reactor fitted with a thermocouple. The catalyst bed was heated to 600° C. prior to the start of $CO/O_2$ flow. Oxidation response was measured using a mixture of 1.8 v/v % CO and 0.9 v/v % $O_2$, balanced with He, under a gas flow rate of 1000 cc/min.

Comparative Experiment E

For comparison Example 6 was repeated but now with a state of the art FCC combustion promoter and lab synthesized FCC combustion promoter prepared by standard homogeneous impregnation method. The CO oxidation response for each of the compositions of Example 5 as measured in Example 6 was comparable to the commercial FCC combustion promoter despite having half the palladium loading. Further, the CO oxidation response for each of the compositions of Example 5 as measured in Example 6 was enhanced compared to lab prepared FCC combustion promoter with the same palladium loading prepared by standard homogeneous impregnation method. Further, the reduction in attrition resistance of the alumina support did not reduce the CO oxidation response.

Example 7

Figure 3:
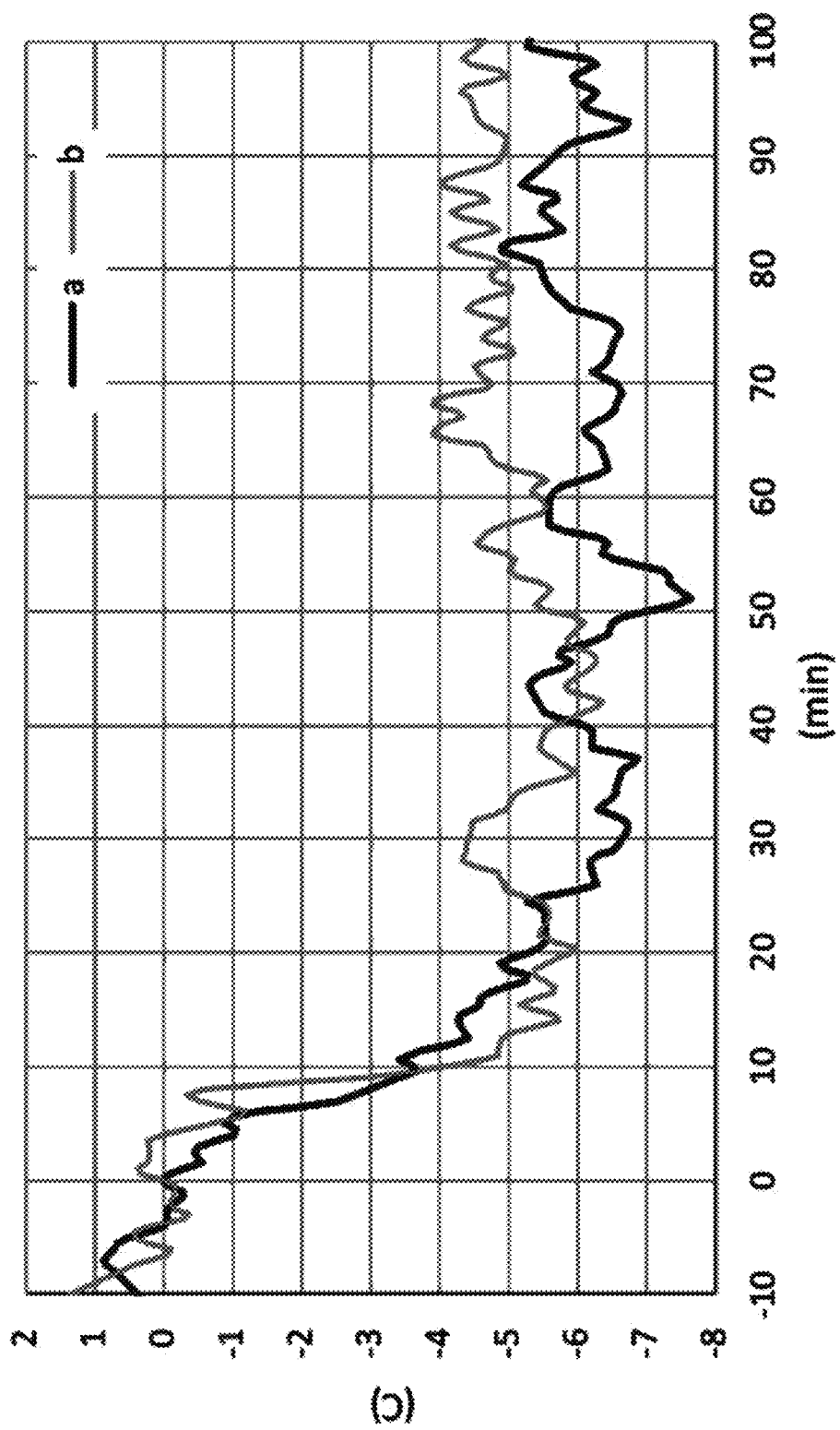
FIG. 3 shows a graph with time on the x-axis after injecting a promoter in a FCC regenerator and on the y-axis the temperature change of the dilute phase of the FCC regenerator.

136 kg (300 lbs) of palladium-based CO combustion promoter according to the invention (Promoter A) was supplied to Refinery A. During a one week trial, Refinery A evaluated the performance in comparison to a state of the art CO combustion 20) promoter (Promoter B) that has approximately twice the palladium content with the palladium distributed homogenously throughout the particles. Afterburn control was maintained using 20% less Promoter A (line (a)) compared to Promoter B (line (b)) as demonstrated in FIG. 3.

Example 8

136 kg (300 lbs) of palladium-based CO combustion promoter according to the invention (Promoter C) was supplied to Refinery B. During a two week trial, Refinery B evaluated the performance in comparison to a state of the art CO combustion promoter (Promoter D) that has approximately twice the palladium content with the palladium distributed homogenously throughout the particles.

Refinery B provided comparative data from the trial, which included data from three weeks prior to the start of the Promoter C trial when Promoter D was used for comparison. The first week of Promoter C trial is the transition from Promoter D, and therefore the second week of Promoter C data was used for comparison purposes and summarized in Table 1.

TABLE 1

| | | Promoter D 3 week average | Promoter C 2nd week average |
|---|---|---|---|
| Flue Gas $O_2$ | mol % | 1.2 | 1.4 |
| Flue Gas CO | ppm | 213.0 | 140.7 |
| Flue Gas NOx | ppm | 52.2 | 36.2 |
| CO Promoter Additions | kg/day | 11 | 9 |

Average flue gas composition and CO Promoter addition rates are given in Table 1. Promoter C controlled CO to lower levels compared to Promoter D despite having half the palladium content. Promoter C and Promoter D both controlled afterburn to acceptable and safe limits. Promoter C achieved this with half the palladium loading and an 18% lower addition rate. NOx emissions declined as Promoter C replaced the Promoter D in the FCC unit inventory, declining by over 30%. This result is attributed to less total palladium, both fresh and sintered, present in the catalyst inventory.

Figure 4:
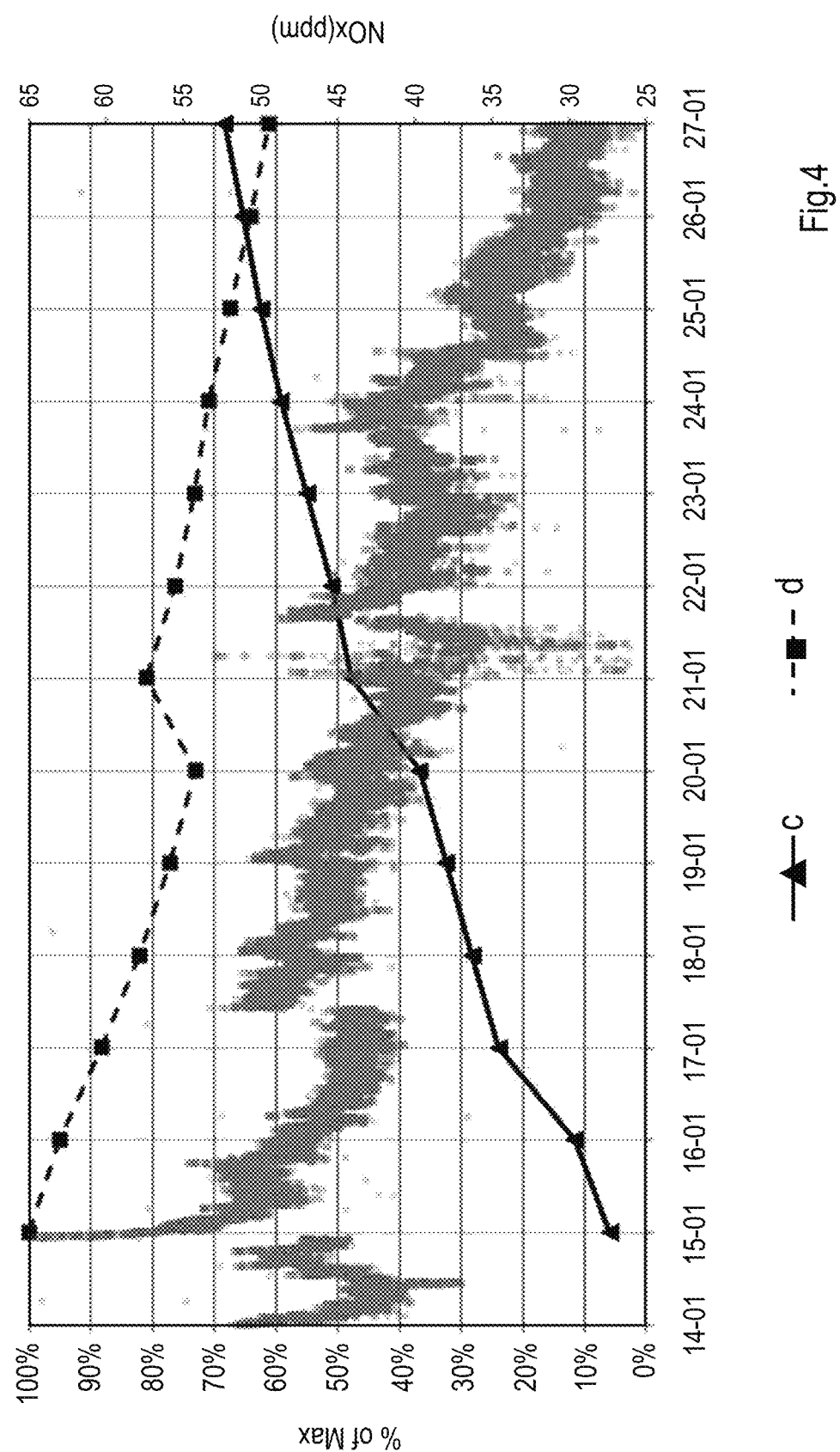
FIG. 4 shows the relative promoter concentrations of the combustion promoter according to this invention and state of the art promoter on the left hand y-axis and the flue gas NOx concentration in ppm on the right hand y-axis. The x-axis were the dates during the period the FCC regenerator was monitored.

The NOx emissions are shown in FIG. 4 where the relative promoter concentrations of Promoter C and Promoter D are on the left hand y-axis and the flue gas NOx concentration in ppm (e) on the right hand y-axis. The x-axis were the dates the regenerator was monitored. FIG. 4 shows the NOx reduction over time when the relative content of Promoter D decreases as Promoter C increases. The content is expressed as a percentage of the maximum concentration of Promoter D. On January 20-21, Promoter D was accidently injected and an increase in NOx emissions is observed.

Refinery B conducted comparative shot tests of Promoter C and Promoter D by injecting 13.6 kg (30 lb) of each promoter. Each injection of 13.6 kg (30 lb) of promoter reduced the FCC afterburn by 5.6° C. (10° F.). NOx emissions from the injections of Promoter C and Promoter D were different. 13.6 kg (30 lb) of Promoter D increased NOx emissions from 45 to 67 ppm, and 180 minutes after injection the NOx emissions remained at 55 ppm. 13.6 kg (30 lb) of Promoter C increased NOx emissions from 45 to 54 ppm, and 180 minutes after injection the NOx emissions remained at 50 ppm. Therefore, Promoter C has a reduced impact on NOx emissions.

What is claimed herein is:

1. A CO to $CO_2$ combustion promoter comprising:
   a porous particle having a diameter of less than 1 mm and comprising:
   a) one or more of silica, alumina, zeolite, silica sol, alumina sol, pseudo-boehmite alumina, and/or a clay-based matrix; and
   b) one or more Group VIII noble metals distributed in the porous particle such that at least 60% of the one or more Group VIII noble metals is present in an outer region of the porous particle.

2. The CO to $CO_2$ combustion promoter according to claim 1, wherein the outer region comprises a depth from the outer surface towards the interior of the particle of at least 1 micron.

3. The CO to $CO_2$ combustion promoter according to claim 1, wherein the outer region comprises a depth from the outer surface towards the interior of the particle of up to 10 microns.

4. The CO to $CO_2$ combustion promoter according to claim 1, wherein the outer region comprises a depth from the outer surface towards the interior of the particle of between 1 to 10 microns.

5. A CO to $CO_2$ combustion promoter comprising a first plurality of porous particles, each porous particle of the first plurality of porous particles being a porous particle of claim 1.

6. The CO to $CO_2$ combustion promoter according to claim 5, wherein the average content of Group VIII noble metal per grams of CO to $CO_2$ combustion promoter is between 100 and 1500 ppm.

7. The CO to $CO_2$ combustion promoter according to claim 5, wherein the first plurality of porous particles comprises silica.

8. The CO to $CO_2$ combustion promoter according to claim 5, wherein the first plurality of porous particles comprise silica; and
the CO to $CO_2$ combustion promoter further comprises a second plurality of porous particles, each of the second plurality of porous particles having a diameter of less than 1 mm and comprising:
a) alumina; and
b) one or more Group VIII noble metals distributed in the porous particle such that at least 60% of the one or more Group VIII noble metals is present in an outer region of the porous particle.

9. The CO to $CO_2$ combustion promoter according to claim 5, wherein the first plurality of porous particles collectively have an average (D50) size of between 60 and 90 microns as measured by laser diffraction.

10. The CO to $CO_2$ combustion promoter according to claim 5, wherein an attrition index as measured according to ASTM D-5757 of the CO to $CO_2$ combustion promoter for a sieve fraction of porous particles of between 40 and 105 microns is between 5 and 25.

11. A composition, inventory, or mixture comprising at least:
the CO to $CO_2$ combustion promoter of claim 5; and
a second plurality of particles comprising FCC catalyst particles.

12. The CO to $CO_2$ combustion promoter according to claim 5, wherein the first plurality of porous particles comprises alumina.

13. The CO to $CO_2$ combustion promoter according to claim 5, wherein the first plurality of porous particles comprises silica and alumina.

14. The CO to $CO_2$ combustion promoter according to claim 5, wherein the first plurality of porous particles collectively have an average (D50) size of between 60 and 90 microns as measured by laser diffraction; and
wherein the outer region comprises a depth from the outer surface towards the interior of the particle of up to 10 microns.

15. The CO to $CO_2$ combustion promoter according to claim 5, wherein the first plurality of porous particles collectively have an average (D50) size of between 60 and 90 microns as measured by laser diffraction; and
wherein the outer region comprises a depth from the outer surface towards the interior of the particle of between 1 to 10 microns.

16. The CO to $CO_2$ combustion promoter according to claim 1, wherein the zeolite is faujasite, Type Y zeolite, and/or ZSM-5.

17. The CO to $CO_2$ combustion promoter according to claim 1, wherein the zeolite is ZSM-5.

18. The CO to $CO_2$ combustion promoter according to claim 1, wherein the porous particle has a surface area (BET) of between 50 and 300 $m^2/g$ in the absence of the one or more Group VIII noble metals.

19. The CO to $CO_2$ combustion promoter according to claim 1, wherein the porous particle is a gamma alumina particle.

20. The CO to $CO_2$ combustion promoter according to claim 1, wherein the porous particle is a theta alumina particle.

21. The CO to $CO_2$ combustion promoter according to claim 1, wherein the porous particle is a spray dried silica particle; or is an equilibrium or spent catalyst as obtained from a fluidized catalytic cracking (FCC) process.

22. The CO to $CO_2$ combustion promoter according to claim 1, wherein the one or more Group VIII noble metals comprises one or more of platinum, palladium, iridium, ruthenium, and rhodium.

23. The CO to $CO_2$ combustion promoter according to claim 22, wherein the one or more Group VIII noble metals comprises platinum.

24. The CO to $CO_2$ combustion promoter according to claim 22, wherein the one or more Group VIII noble metals comprises palladium.

25. The CO to $CO_2$ combustion promoter according to claim 22, wherein the one or more Group VIII noble metals comprises platinum and palladium.

26. The CO to $CO_2$ combustion promoter according to claim 1, wherein the porous particles further comprise at least one of cerium oxide and copper oxide.

27. The CO to $CO_2$ combustion promoter according to claim 26, wherein the at least one of cerium oxide and copper oxide is distributed in the porous particles such that a higher concentration of the at least one of cerium oxide and copper oxide is present in the outer region of the porous particle as compared to the concentration of the at least one of cerium oxide and copper oxide in the centre of the porous particle.

28. A method of fluid catalytic cracking, the method comprising contacting a CO to $CO_2$ combustion promoter of claim 1 with CO in a fluidized bed of an FCC unit.

29. A method of CO to $CO_2$ combustion, the method comprising contacting a CO to $CO_2$ combustion promoter of claim 1 with CO in a fluidized bed.

30. The CO to $CO_2$ combustion promoter according to claim 1, wherein the porous particle has a pore volume of between 0.05 and 0.50 mL/g as measured by the water pore volume in the absence of the one or more Group VIII noble metals.

* * * * *